J. O. McARTHUR.
PISTON.
APPLICATION FILED JULY 20, 1920. RENEWED SEPT. 8, 1921.
1,394,204.
Patented Oct. 18, 1921.
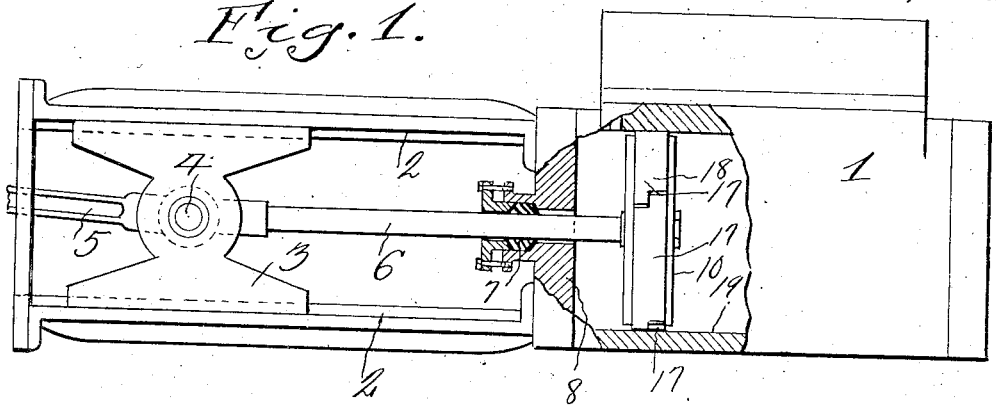
Fig. 1.
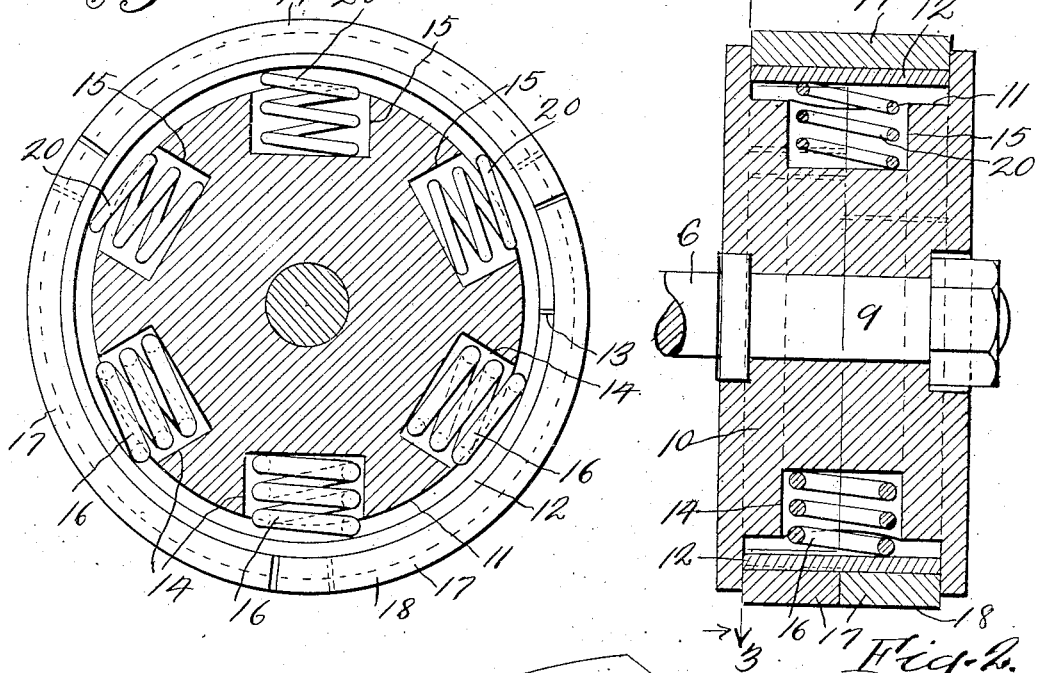
Fig. 3.
Fig. 2.
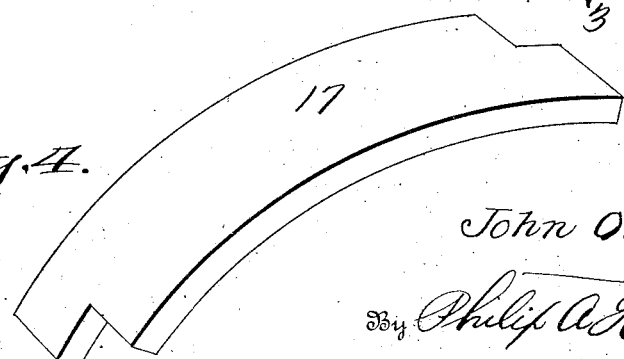
Fig. 4.
Inventor
John O. McArthur
By Philip A. H. Jerrell
Attorney

UNITED STATES PATENT OFFICE.

JOHN O. McARTHUR, OF MILWAUKEE, WISCONSIN.

PISTON.

1,394,204.  Specification of Letters Patent.  Patented Oct. 18, 1921.

Application filed July 20, 1920, Serial No. 397,698. Renewed September 8, 1921. Serial No. 499,316.

*To all whom it may concern:*

Be it known that I, JOHN O. McARTHUR, a citizen of the United States, residing at Milwaukee, in the county of Milwaukee and State of Wisconsin, have invented certain new and useful Improvements in Pistons, of which the following is a specification, reference being had therein to the accompanying drawing.

The invention relates to pistons used principally in connection with horizontally disposed cylinders of locomotives, and has for its object to provide a piston ring, which piston ring will be forced outwardly and downwardly incident to wear, without causing or allowing the movement of the piston rod out of axial alinement with the cylinder bore, thereby reducing the wear on the stuffing box gland to a minimum and preventing escape of steam through the gland. Also to provide a piston packing which will obviate the necessity of constant overhauling and repairing incident to wear.

A further object is to provide a piston having a circumferential channel for the reception of a sectional packing ring, the sections of which are overlapped and for the reception of a spring ring on which the packing ring sections rest, and to provide radially disposed spiral springs disposed in pockets of the circumferential channel for forcing the spring ring and packing ring sections outwardly to take up the wear. The spiral spring adjacent the bottom side of the piston being of greater expansible power than the spiral spring at the upper side of the piston so that the weight of the piston will be subsantially supported on the lower springs, and as the ring wears adjacent the bottom of the piston the piston packing will be forced downwardly without causing the piston to move out of axial alinement with the cylinder bore. The spiral springs adjacent the top of the piston which are smaller than the springs adjacent the bottom forming means whereby the shock or what is known as the slap of the piston, will be taken up before the spring ring and packing rings engage the bottom of the circumferential channels, thereby obviating the common difficulty found in rings used in connection with heavy pistons, where this slap shatters the ring and causes longitudinal scoring of the cylinder bore.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

In the drawings:—

Figure 1 is a side elevation of a locomotive cylinder and crosshead, parts being broken away to show the piston in the cylinder.

Fig. 2 is a vertical sectional view through the piston.

Fig. 3 is a transverse vertical sectional view through the piston taken on line 3—3 of Fig. 2.

Fig. 4 is a perspective view of one of the sections of the packing ring.

Referring to the drawings, the numeral 1 designates a cylinder of a locomotive. and 2 crosshead guides thereof. Cylinder 1 and crosshead guides 2 are disposed in a horizontal plane and are of a conventional form. Slidably mounted in the crosshead guides 2 is a crosshead 3 on the wrist pin 4 of which is connected the connecting rod 5, which leads to the drive wheel of the locomotive and also the piston rod 6, which piston rod passes through a stuffing box 7 carried by the cylinder head 8. Secured to the end 9 of the piston rod 6 is a piston 10, said piston being provided with a circumferential cam 11. Disposed in the circumferential channel 11 and spaced from the bottom thereof is a spring ring 12, which is split as at 13, so that it may expand and contract. Piston 10 is provided with radially disposed pockets 14 and 15. Disposed in the pockets 14 are heavy spiral springs 16, which springs exert an expansive pressure upon the spring ring 12 in a downward direction so that as the sections 17 of the packing ring 18 wears, said sections will be forced downwardly to take up the wear without causing a correspondingly downward movement of the piston 10 in relation to the axis of the bore 19 of the cylinder 1.

It has been found that where spiral springs are used, which spiral springs are supposed to be of the same expansive force that this force is never uniform and as the wear on the piston ring used in connection with heavy pistons is adjacent the bottom of the piston, the heavy springs 16 are placed adjacent said bottom. However, there is another element or difficulty to be overcome in heavy pistons and is what is known as the slap. In horizontal cylinders, it is upwardly and downwardly. The downward slap is taken up by the heavy springs 16, however, to take up the upward slap, spiral springs 20 are disposed in the pockets 15. Springs 20 are considerably lighter than the springs 16 so as not to overcome the downward forcing of the packing ring 18 incident to wear, however the springs 20 are not tensioned when the rings are in the positions shown in Fig. 3, but come into action during an upward slap of the piston and take up the shock before the spring ring 12 engages the bottom of the circumferential groove 11, thereby preventing shattering of the spring ring and the shattering of the packing ring section 17 at the upper side of the piston. It will be seen that the piston 10 will be maintained substantially axially disposed within the bore 19 of the cylinder and that the wear on the packing gland 7 will be reduced to a minimum. It will also be seen that the wear on the lower side of the packing ring 18 will be taken up without causing the piston 10 to move out of axial alinement with the center of the bore 19 of the cylinder.

The invention having been set forth, what is claimed as new and useful is:

1. The combination with a piston having an annular channel in the periphery thereof, of a packing ring disposed in said channel, coiled springs disposed in pockets in the bottom of the channel, said coiled springs having their outer ends in engagement with the packing ring, the spiral springs to one side of the piston being of greater expansive force than the coiled springs at the other side of the piston thereby forming means for taking up the wear on the packing rings at its point of greatest wear and also forming means for supporting the weight of the piston.

2. The combination with a piston having a annular channel in the periphery thereof, of a split spring ring disposed in said channel and spaced from the bottom thereof, spiral springs interposed between the split spring ring and the bottoms of pockets in the bottom of the channel, a sectional packing ring disposed in the channel and surrounding the split spring ring, the spiral springs adjacent the weight supporting portion of the packing ring being of greater expansive power than the other spiral springs so as to support the weight of the piston and take up the wear of the packing ring as it wears, the lighter spiral springs at the opposite sides of the piston forming means for taking up the slap of the piston in the opposite direction.

In testimony whereof I hereunto affix my signature.

JOHN O. McARTHUR.